US012649426B2

(12) United States Patent
 Reinhardt

(10) Patent No.: US 12,649,426 B2
(45) Date of Patent: Jun. 9, 2026

(54) DISTRIBUTED CONTROL PLATFORM FOR A MOTOR VEHICLE

(71) Applicant: Bayerische Motoren Werke Aktiengesellschaft, Munich (DE)

(72) Inventor: Dominik Reinhardt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/895,564

(22) Filed: Sep. 25, 2024

(65) Prior Publication Data

US 2025/0100478 A1 Mar. 27, 2025

(30) Foreign Application Priority Data

Sep. 26, 2023 (DE) ..................... 10 2023 126 061.8

(51) Int. Cl.
| | |
|---|---|
| *B60R 16/023* | (2006.01) |
| *G06F 13/40* | (2006.01) |
| *H04L 12/40* | (2006.01) |

(52) U.S. Cl.
CPC ........ *B60R 16/023* (2013.01); *B60R 16/0231* (2013.01); *G06F 13/40* (2013.01); *G06F 2213/0026* (2013.01); *H04L 2012/40273* (2013.01)

(58) Field of Classification Search
CPC .............. B60R 16/023; B60R 16/0231; B60R 16/0239; G06F 13/38; G06F 13/40; G06F 13/4282; G06F 2213/0026; H04L 2012/40273
See application file for complete search history.

(56) References Cited

U.S. PATENT DOCUMENTS

| | | | | |
|---|---|---|---|---|
| 2008/0228970 A1* | 9/2008 | Schneider | ................ | H05K 1/14 |
| | | | | 710/104 |
| 2021/0182110 A1* | 6/2021 | Ye | ......................... | G06F 9/4881 |
| 2023/0350369 A1* | 11/2023 | Zhao | .................... | G05B 19/042 |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Apr. 2021, pp. 1-41 (41 pages).

* cited by examiner

*Primary Examiner* — Levi Gannon
(74) *Attorney, Agent, or Firm* — Crowell & Moring LLP

(57) ABSTRACT

A processing system for a motor vehicle includes a first and a second control platform; wherein a control platform has a motherboard having a plurality of slots and a switch; an expansion bus that connects the switch to the slots; a first plug-in card having a processing device; and a second plug-in card. The second plug-in cards are connected to each other by way of a connection cable and are configured to couple the expansion buses to each other.

11 Claims, 5 Drawing Sheets

110
115

DISTRIBUTED CONTROL PLATFORM FOR A MOTOR VEHICLE

CROSS REFERENCE TO RELATED APPLICATION

This application claims priority under 35 U.S.C. § 119 from German Patent Application No. DE 10 2023 126 061.8, filed Sep. 26, 2023, the entire disclosure of which is herein expressly incorporated by reference.

BACKGROUND AND SUMMARY

The present invention relates to a control platform for a motor vehicle. In particular, the invention relates to a flexible platform for automatically controlling a motor vehicle.

A motor vehicle comprises a driver assistance system which is configured to assist a human driver with the control of the motor vehicle. For example, the driver assistance system may comprise a lane departure assistant, an automatic spacer or an electronic stability program for controlling a chassis. Such functions are usually performed using processing devices that are specifically optimized for the assigned purpose. Certain processing devices may also implement a plurality of driver assistance systems, in particular those acting on the same subsystem of the motor vehicle. For example, a processing device for controlling the chassis may be provided and may perform both a safety function, such as electronic stabilization, and a comfort function, such as level control.

However, far more complex processing devices are needed to further control the motor vehicle in the longitudinal and/or lateral direction by means of an advanced driver assistance system (ADAS). For example, the motor vehicle can be controlled autonomously to a limited extent on the basis of scanning of its environment. Scanning can be effected using cameras or LiDAR sensors which can provide considerable data streams of sensor data.

Other tasks on board the motor vehicle, such as controlling an entertainment system or a drive system, may take place on another control platform for safety reasons. If a control platform is intended to access data from the other control platform, a request and transfer are usually required. Data that are present on one side are copied to the other side. This procedure can be complicated and time-consuming, thus making it difficult to access short-lived data, for example.

One object on which the present invention is based is to provide an improved technique for distributing information on board a motor vehicle. The invention achieves this object by means of the subjects of the independent claims. Preferred embodiments are specified in dependent claims.

According to a first aspect of the present invention, a processing system for a motor vehicle comprises a first and a second control platform. A control platform comprises a motherboard having a plurality of slots and a switch; an expansion bus that connects the switch to the slots; a first plug-in card having a processing device; and a second plug-in card. The second plug-in cards are connected to each other by means of a connection cable and are configured to couple the expansion buses to each other.

The first and the second control platforms can be connected to each other in terms of data using the two plug-in cards connected to each other. A direct connection between expansion buses of the control platforms can be established. Data can be transmitted between the control platforms at high speed and with low latency. Connecting each of the second plug-in cards directly to the expansion bus means that the two platforms can be closely coupled in terms of data.

This makes it possible for a first application running on the one platform to read data from a memory area of a second application running on the other platform. As a result, it may not be necessary to copy the data from the one platform to the other, which would require significantly more storage space. It is also possible for the first application to have write access to the data of the second application without first creating its own copy and then comparing it with the first data. Cooperation between the applications or control platforms can thus be significantly simplified.

A system that evaluates data, especially sensor data, at a plurality of points can be implemented more easily and more efficiently. A processing speed of the system may be increased. In particular, if one of the control platforms performs continuous data processing, during which sensor data are evaluated in a continuous stream, the proposed architecture of the control system can be virtually unloaded, while the data can be simultaneously made available to the other control platform. The first control platform may be configured, for example, to control the motor vehicle, wherein incoming sensor data can be so extensive that an additional process for copying the data would massively load an executing processing device. The proposed system can easily make the sensor data available to another control platform. For example, the sensor data may come from a camera and the second control platform may use the camera data for a camera mirror system (CMS) or a reversing camera.

It is preferred that the slots are identical. Thus, a processing device on a first plug-in card can represent the same type of subscriber on the expansion bus as the second plug-in card. Data can be transmitted in a uniform format. The individual plug-in cards can be interchangeable between the slots.

In one particularly preferred embodiment, the expansion bus comprises PCIe. A PCIe connection can be operated in version 2.0 or 3.0; a higher transmission power can be achieved with version 4.0 or 5.0. Subsequent versions of the standard will presumably also be compatible. This enables a very high transmission speed to be achieved. Depending on a data volume to be transmitted, PCI can be implemented with a suitable number of lanes and a suitable speed factor.

Preferably, a second plug-in card is configured to present itself to a first plug-in card as an Ethernet adapter. Data transmission based on the Ethernet standard is established among many applications and apparatuses, making it possible to easily implement the protocol. In this way, a further subscriber on the expansion bus can be easily communicatively integrated into the processing system.

It is particularly preferred that a control platform comprises a plurality of first plug-in cards. The plug-in cards can each implement a complete computer with a processing device, memory, an interface and auxiliary modules. Plug-in cards having differently powerful processing devices can be interchangeable on a control platform. Two or more first plug-in cards can be operated as a redundant system. A safety-relevant function on board the motor vehicle can thus be controlled in an improved manner.

A second plug-in card may comprise a line driver for transmitting electrical signals via the connection cable. The electrical signals may be matched to the connection cable in such a way that it is possible to bridge a sufficient distance on board the motor vehicle between the control platforms. In one embodiment, the connection cable can reach a length of approx. 8 m.

The second plug-in card may comprise a timer in order to control a timing of a signal which is transmitted via the connection cable. It can be taken into account here that signal rise and fall times are changed via the connection cable and effects such as attenuation or crosstalk can distort the signal.

An intermediate card may be provided between a motherboard and a slot. Additional logic, which is only required when a second plug-in card is connected to the slot, may be mounted on the intermediate card. In particular, a line driver or a timer may be provided on the intermediate card.

In another embodiment, the processing system comprises a sensor which is connected to the first control platform. The sensor may be configured to provide sensor values in a data stream. For example, the sensor may be configured to scan an environment of the motor vehicle and may comprise a camera, a radar sensor or a LiDAR sensor. Data provided by the sensor can be transmitted to the second control platform at high speed via the connection cable. In one embodiment, the sensor is connected to the expansion bus. This allows sensor data to be distributed directly to both control platforms. Processing of the sensor data for different purposes can thus be improved.

One of the control platforms may be configured to control the motor vehicle. A degree of autonomy according to SAE standard J3016 can reach level 3; control at another level of autonomy is also possible. In this case, a driver on board the motor vehicle does not have to constantly monitor the control system running on the control platform. For example, the other control platform may be configured to control an on-board entertainment system. Both systems can exchange information with each other at high speed, especially sensor values or processing results.

The processing system can also be extended or distributed across more than two control platforms. In one embodiment, a further control platform is provided and is connected to one of the other control platforms by means of a further pair of two plug-in cards which are connected to each other by means of a connection cable. The three or more control platforms can be connected to each other according to a predetermined topology. For example, four or more control platforms can be connected to each other in the form of a ring, with the result that each control platform is connected to two other control platforms. Other topologies are also possible.

According to another aspect of the present invention, a motor vehicle comprises a processing system as described herein. The motor vehicle may include, in particular, an automobile, a truck, a motorcycle or a bus.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
FIG. 1 illustrates a processing system on board a motor vehicle.

FIG. 1 shows a processing system 100 on board a motor vehicle 105. The processing system 100 comprises a first control platform 110 and a second control platform 115, which are connected to each other by means of a connection cable 120. The first control platform 110 is additionally connected to a plurality of sensors 125.

In the embodiment shown, the first control platform 110 is configured to control the motor vehicle 105. For this purpose, an environment of the motor vehicle 105 can be scanned by means of the sensors 125, and the motor vehicle 105 can be automatically controlled in the longitudinal and/or lateral direction. The second control platform 115 may be configured, for example, to implement or control an entertainment system for a person on board the motor vehicle 105. The second control platform 115 can also perform another function or an additional function, for example that of an entry or navigation system. The connection cable 120 can be used to exchange information between the control platforms 110, 115. Such information may include, in particular, processing results or sensor data from one of the sensors 125.

Figure 2:
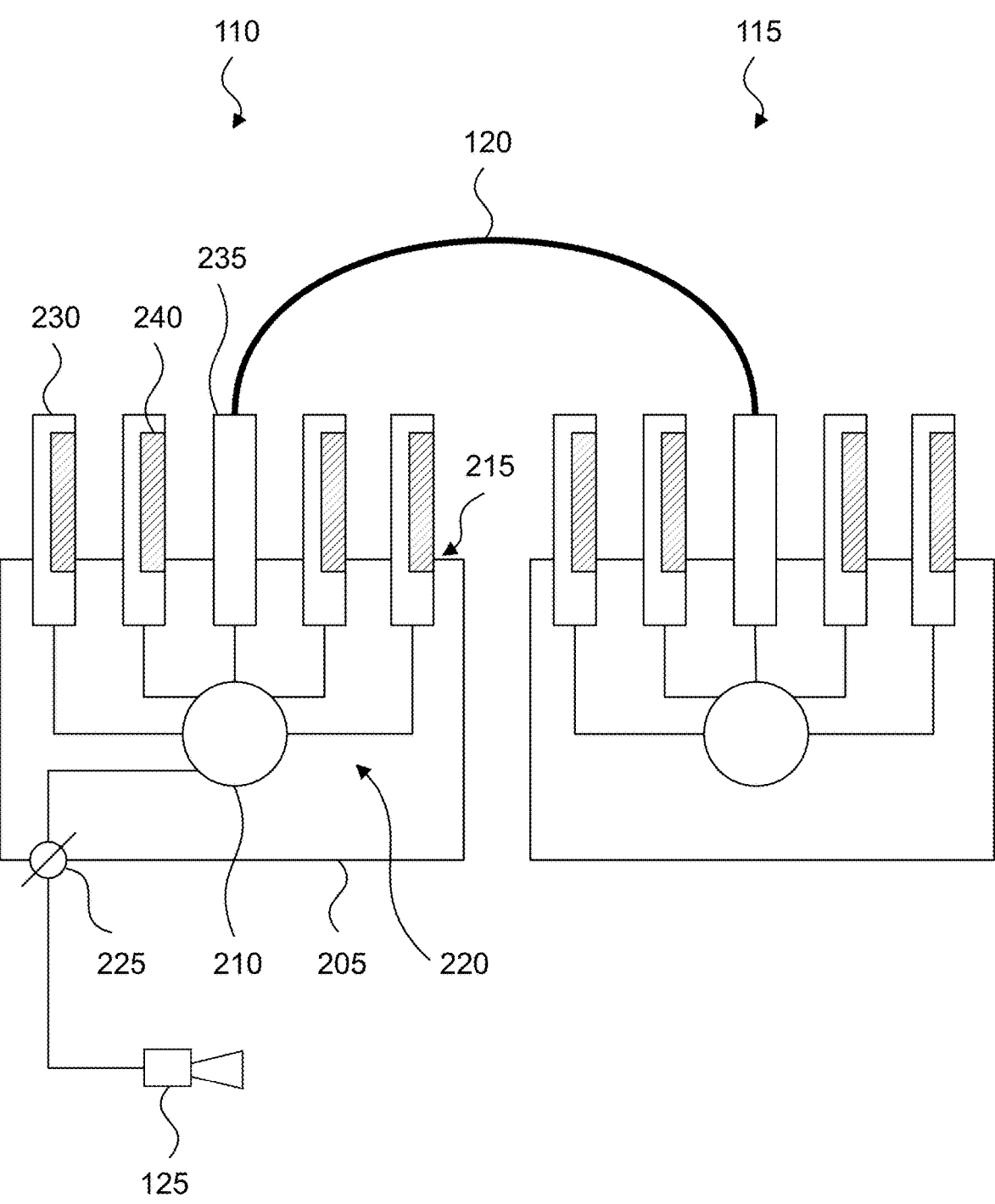
FIG. 2 illustrates a schematic representation of a processing system.

FIG. 2 shows a schematic representation of a processing system 100. The control platforms 110 and 115 can have substantially the same structure. A control platform 110, 115 comprises a motherboard 205, a switch 210 and a plurality of slots 215. An expansion bus 220 connects the slots 215 to the switch 210. An interface 225 which can be used to connect a sensor 125 is optionally provided. The sensor 125 can be connected to the switch 210 directly or with the interposition of another switch.

A first plug-in card 230 or a second plug-in card 235 can be inserted into a slot 215. A first plug-in card 230 comprises a processing device 240 which can be implemented in particular as a system on a module (SOM) or a system on a chip (SOC). Identical or different first plug-in cards 230, for example with differently powerful processing devices 240, can be used on a control platform 110, 115.

The expansion bus 220 is preferably designed as a PCI bus. Two second plug-in cards 235, which are connected to each other by means of the connection cable 120, can be inserted into slots 215 of different control platforms 110, 115 and can thus connect both control platforms 110, 115 to each other. A resulting network topology can allow data to be transmitted quickly and directly between different first plug-in cards 230. In this case, the control platform 110, 115 on which the respective other first plug-in card 230 is inserted may be irrelevant for the plug-in cards 230. In a corresponding manner, a processing device 240 on a first plug-in card 230 can communicate with a sensor 125, regardless of whether or not the first plug-in card 230 and the sensor 125 are connected to the same control platform 110, 115.

Figure 3:
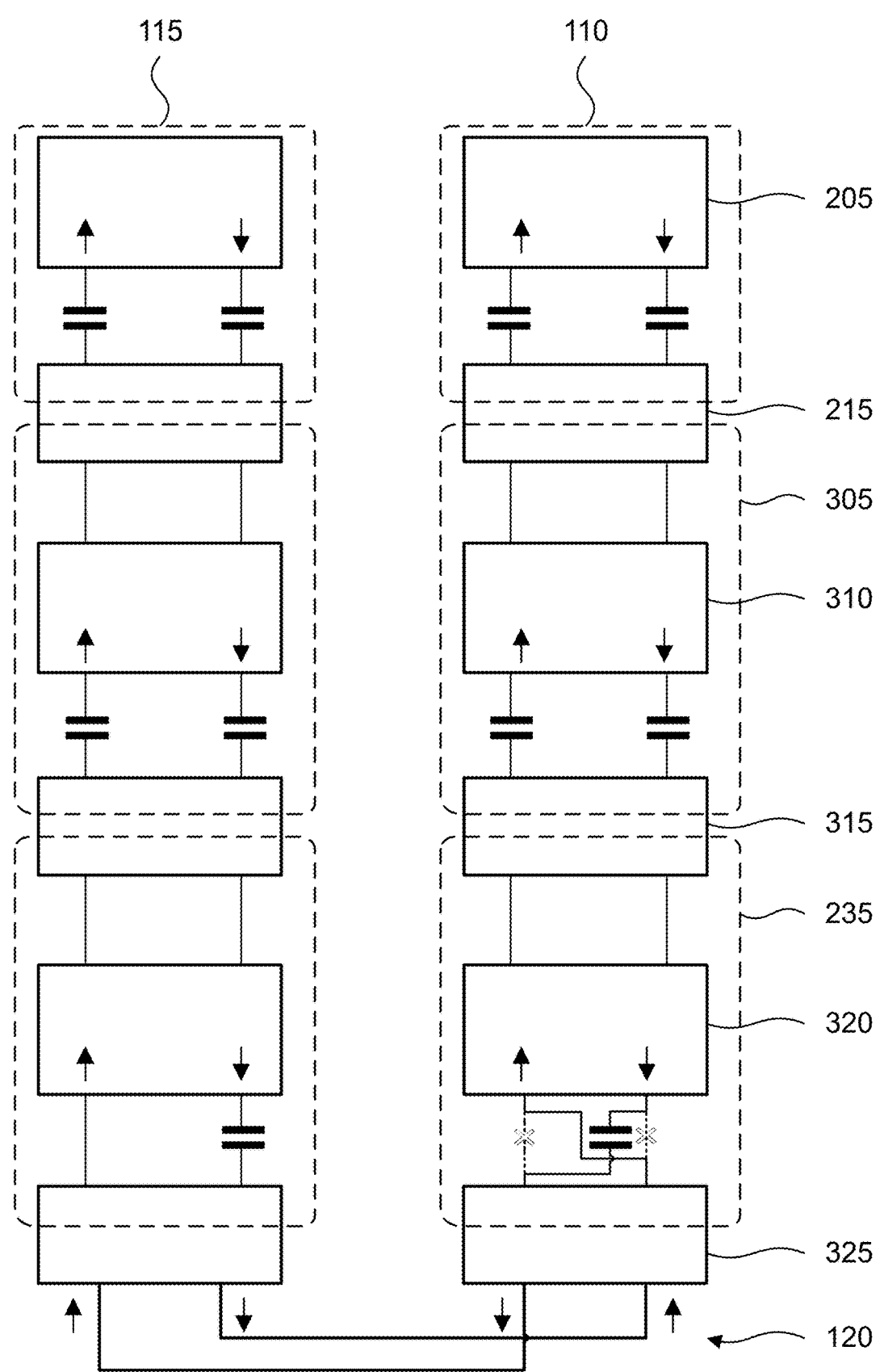
FIG. 3 illustrates a schematic representation of control platforms connected to each other.

FIG. 3 shows a schematic representation of control platforms 110, 115 connected to each other. A first section between the first control platform 110 and the connection cable 120 and a second section between the second control platform 115 and the connection cable 120 correspond to each other, and so only the section shown on the right with respect to the first control platform 110 is described below in a representative manner. The section comprises a first signal path from the first control platform 110 to the connection cable 120 and a second signal path, running in the opposite direction, from the connection cable 120 to the first control platform. Buffers/drivers provided between elements of a section are represented by capacitor circuit symbols.

An intermediate card 305, which can also have a mechanical function in addition to an electrical or signaling function, is inserted in the slot 215 on the motherboard 205 of the first control platform 110, as is described in more detail with reference to FIG. 4. A line driver 310, which is configured to amplify incoming or outgoing signals, may be mounted on the intermediate card 305. An exemplary line driver (redriver) can be of the type DS80PCI402SQ. A further slot 315, into which a second plug-in card 235 is inserted, is mounted on the intermediate card 305. A timer (retimer) 320, which can adjust timings of incoming and outgoing signals, is arranged in the signal path on the second plug-in card 235. An exemplary timer 320 can be of the type DS160PT801. In addition, a cable connector 325, to which the connection cable 120 is connected, is mounted on the second plug-in card 235. In different embodiments, the connection cable 120 can be released from a cable connector 325 or is connected to this in a non-releasable manner.

The described signal path can be duplicated, in which case one path can be provided for one transmission direction and the other path can be provided for the opposite direction. In order to correctly assign the signal paths, corresponding lines on the second plug-in card 235 can be interchanged. In the representation of FIG. 3, this is shown by way of example between the timer 320 and the cable connector 325.

Figure 4:
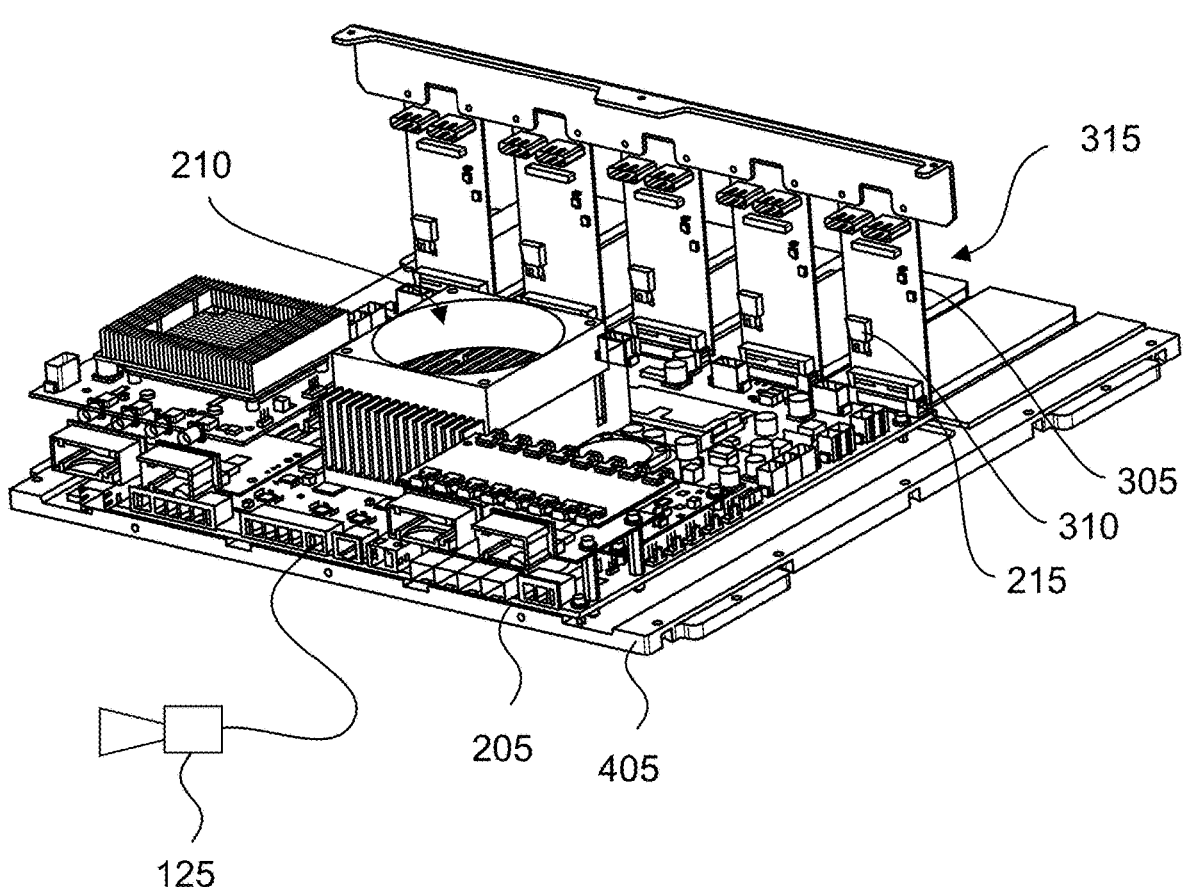
FIG. 4 illustrates an exemplary control platform.

FIG. 4 shows a control platform 110, 115 in an exemplary embodiment. The motherboard 205 is mounted on a carrier plate 405 which can provide a mechanical connection to plug-in cards 230, 235. Slots 215 on the motherboard 205 allow a card to be inserted from a vertical direction. Inserted into each slot 215 is an intermediate card 305 having a slot 315 for accommodating a first or second plug-in card 230, 235. The slot 315 is configured here to accommodate the card 230, 235 in the horizontal direction.

The switch 210, which connects the slots 215 to each other by means of the expansion bus 220, is mounted approximately in the center of the motherboard 205 and is covered by a heat sink in the representation of FIG. 4.

Figure 5:
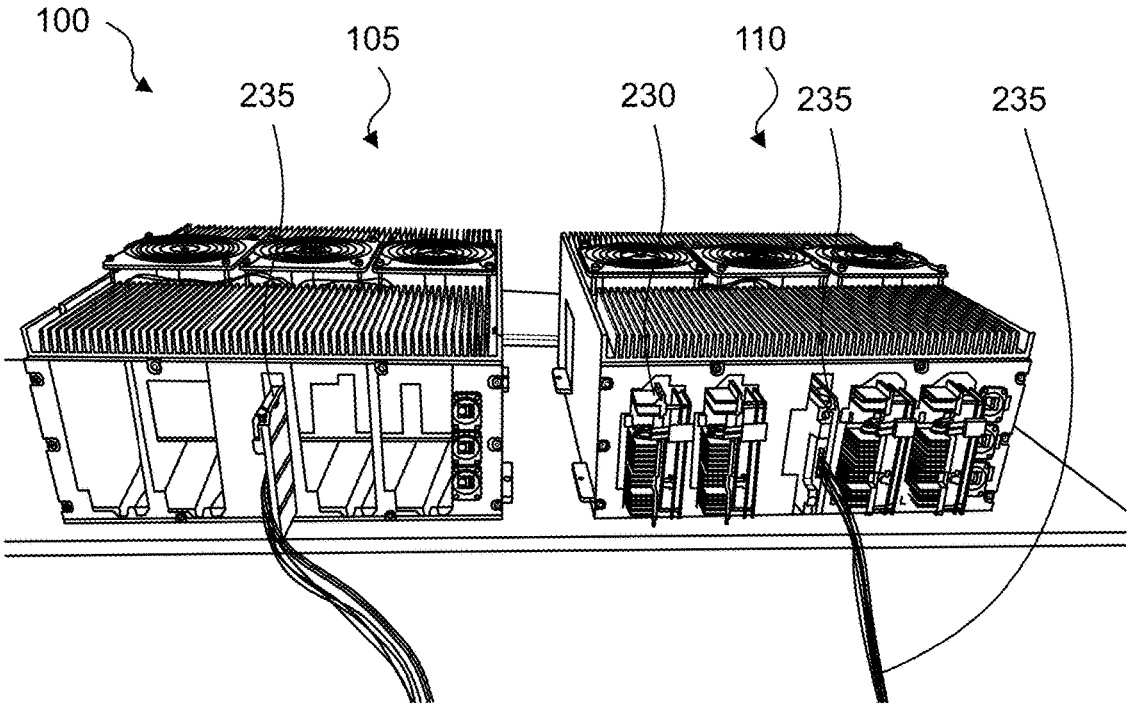
FIG. 5 illustrates two control platforms connected to each other.

FIG. 5 shows two exemplary control platforms 110, 115 connected to each other. By way of example, a total of four first plug-in cards 230 and one second plug-in card 235 are used in the first control platform 110. Two first plug-in cards 230 are each located on opposite sides of the second plug-in card 235. Only one second plug-in card 235 is inserted in the second control platform 115 and is connected to the other second plug-in card 235 by means of the connection cable 120.

Figure 6:
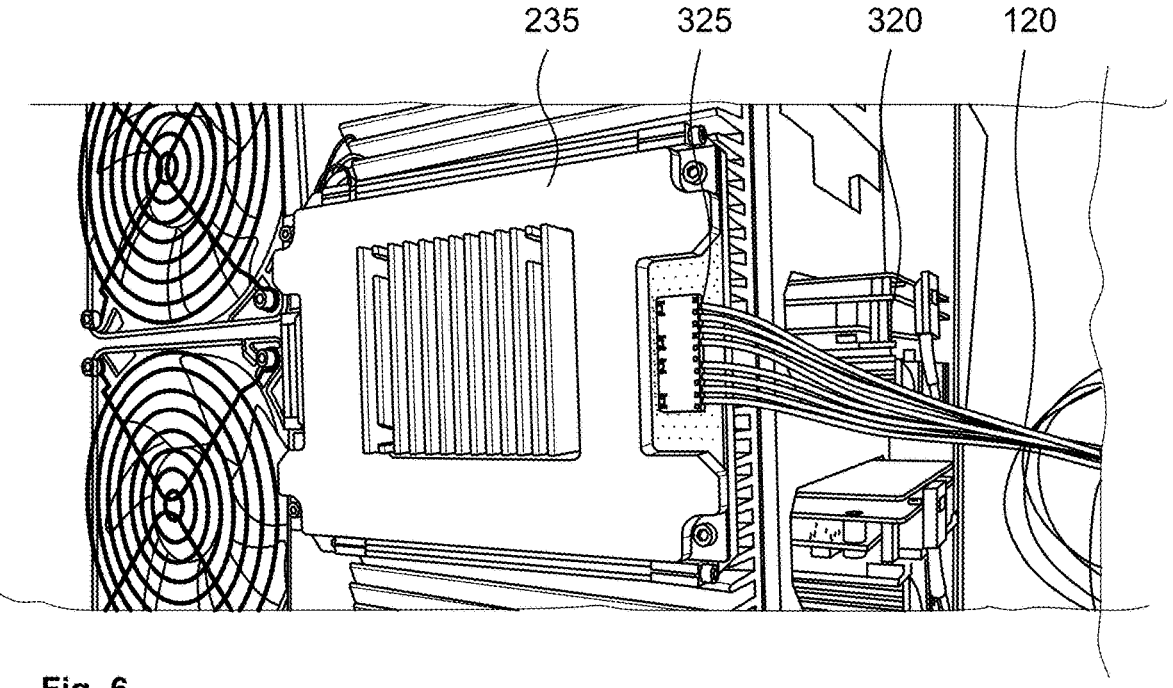
FIG. 6 illustrates a plug-in card for connecting two control platforms.

FIG. 6 shows an exemplary embodiment of a second plug-in card 235 for connecting two control platforms 110, 115. The second plug-in card 235 shown can be approximately in the European board format of 100×160 mm. In the present case, the connection cable 120 comprises a total of eight individual lines, four of which are respectively provided for each transmission direction. A housing of a control platform, in which up to five plug-in cards can be used in the present embodiment, has, for example, the size of a 19-inch slot. It is expected that the present control system 100 will be able to be more compact in future generations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS

100 Processing system
105 Motor vehicle
110 First control platform
115 Second control platform
120 Connection cable
125 Sensor
205 Motherboard
210 Switch
215 Slot
220 Expansion bus
225 Interface
230 First plug-in card
235 Second plug-in card
240 Processing device
305 Intermediate card
310 Line driver
315 Slot
320 Timer
325 Cable connector
405 Carrier plate

What is claimed is:

1. A processing system for a motor vehicle, the processing system comprising:
    a first and a second control platform;
    wherein each of the first and second control platforms comprise:
        a motherboard having a plurality of slots and a switch;
        an expansion bus that connects the switch to the plurality of slots, the expansion bus comprising PCIe;
        a first plug-in card having a processing device; and
        a second plug-in card;
    wherein the second plug-in cards are connected to each other via a connection cable and are configured to couple the expansion buses to each other; and
    wherein a respective second plug-in card is configured to present itself to a first plug-in card as an Ethernet adapter.

2. The processing system according to claim 1, wherein the plurality of slots are identical.

3. The processing system according to claim 1, wherein a respective control platform comprises a plurality of first plug-in cards.

4. The processing system according to claim 1, further comprising:
    a sensor which is connected to the first control platform.

5. The processing system according to claim 1, wherein one of the control platforms is configured to control the motor vehicle.

6. The processing system according to claim 1, further comprising:
    a further control platform which is connected to one of the first or second control platforms via a further pair of second plug-in cards.

7. A motor vehicle comprising a processing system according to claim 1.

8. A processing system for a motor vehicle, the processing system comprising:
    a first and a second control platform;
    wherein each of the first and second control platforms comprise:
        a motherboard having a plurality of slots and a switch;

an expansion bus that connects the switch to the plurality of slots;

a first plug-in card having a processing device; and a second plug-in card;

wherein the second plug-in cards are connected to each other via a connection cable and are configured to couple the expansion buses to each other; and wherein a respective second plug-in card comprises a line driver for transmitting electrical signals via the connection cable.

9. A processing system for a motor vehicle, the processing system comprising:

a first and a second control platform;

wherein each of the first and second control platforms comprise:

a motherboard having a plurality of slots and a switch;

an expansion bus that connects the switch to the plurality of slots;

a first plug-in card having a processing device; and a second plug-in card;

wherein the second plug-in cards are connected to each other via a connection cable and are configured to couple the expansion buses to each other; and wherein a respective second plug-in card comprises a timer in order to control a timing of a signal which is transmitted via the connection cable.

10. A processing system for a motor vehicle, the processing system comprising:

a first and a second control platform;

wherein each of the first and second control platforms comprise:

a motherboard having a plurality of slots and a switch;

an expansion bus that connects the switch to the plurality of slots;

a first plug-in card having a processing device; and a second plug-in card;

wherein the second plug-in cards are connected to each other via a connection cable and are configured to couple the expansion buses to each other; and wherein an intermediate card is provided between a respective motherboard and a slot.

11. The processing system according to claim 10, wherein a line driver for transmitting electrical signals via the connection cable or a timer in order to control a timing of a signal which is transmitted via the connection cable is mounted on the intermediate card.

\* \* \* \* \*